United States Patent [19]

Stolz

[11] 4,315,349
[45] Feb. 16, 1982

[54] CONNECTING STRIP FOR CONVEYOR BELTS

[75] Inventor: Hermann Stolz, Muehlheim, Fed. Rep. of Germany

[73] Assignee: MATO Maschinen- und Metallwarenfabrik Curt Matthaei GmbH & Co. KG, Offenbach, Fed. Rep. of Germany

[21] Appl. No.: 141,218

[22] Filed: Apr. 17, 1980

[30] Foreign Application Priority Data

May 21, 1979 [DE] Fed. Rep. of Germany ....... 2920461

[51] Int. Cl.³ ............................................... F16G 3/02
[52] U.S. Cl. .................... 24/33 C; 24/33 B; 24/33 F; 24/33 P; 24/31 H
[58] Field of Search ............... 24/33 C, 33 L, 33 P, 24/33 B, 33 K, 33 M, 33 V, 33 W, 33 R

[56] References Cited

U.S. PATENT DOCUMENTS

| 2,072,148 | 3/1937 | Wydeen | 24/33 C |
|---|---|---|---|
| 2,158,007 | 5/1939 | Ellis et al. | 24/33 C |
| 2,228,926 | 1/1941 | Matthaei et al. | 24/33 C |
| 2,912,732 | 11/1959 | Stolz et al. | 24/33 C |
| 3,058,864 | 10/1962 | Pechin, Jr. | 24/31 B |
| 3,071,830 | 1/1963 | Stolz | 24/33 C |
| 3,107,406 | 10/1963 | Tebb | 24/33 C |
| 3,165,800 | 1/1965 | Stolz | 24/33 C |
| 3,171,177 | 3/1965 | Carraro | 24/33 C |
| 4,060,877 | 12/1977 | Schick | 24/33 B |

FOREIGN PATENT DOCUMENTS

| 163366 | 11/1948 | Austria | 24/31 H |
|---|---|---|---|
| 2701555 | 1/1977 | Fed. Rep. of Germany | 24/33 P |
| 660157 | 7/1929 | France | 24/31 H |
| 2365730 | 9/1976 | France | 24/33 B |

Primary Examiner—Victor N. Sakran
Attorney, Agent, or Firm—W. G. Fasse; D. F. Gould

[57] ABSTRACT

A connector strip for conveyor belts includes a plurality of preshaped individual connector elements (1) which are held together by a wire (2) secured to the inside of a leg of each connector element (1). The wire has a wave form shape whereby the bendability of the connector is maintained.

6 Claims, 5 Drawing Figures

CONNECTING STRIP FOR CONVEYOR BELTS

BACKGROUND OF THE INVENTION

The invention relates to a connecting strip for conveyor belts made of preformed individual elements which are held together by a wire secured to the inside of the elements.

Such connecting strips are known, for example, from German Pat. No. 977,202. The known version has the disadvantage that the bendability of the connection due to the relatively rigid cross wire, which is located outside the neutral axis of the belt connection to be bent, impairs the flexing of the connection, for example when the conveyor belts form a curve.

Further, it is possible that in a connection of especially soft types of rubber with an inserted fabric ply, a curvature of the individual connecting strips out of the plane of the belt may occur so that along the entire edge of the belt a waviness of the connecting strips is caused.

It is further known from said German Pat. No. 977,202 to align and secure the connecting elements on paper strips. Such alignment on paper strips has the disadvantage that upon clamping the conveyor belts the visibility into the connecting elements through the paper strip is impaired. Thus, there is no possibility of visually checking the proper positioning of the belt end to be connected. This may result in less reliable or faulty connections.

Additionally, a paper strip is very delicate in spite of its impregnation having regard to the rough operating conditions in a mine. Thus, it is possible that individual elements of a connecting strip are lost even before the strip is used for its intended purpose.

OBJECTS OF THE INVENTION

In view of the above it is the aim of the invention to achieve the following objects singly or in combination:
- to construct a conveyor belt connecting strip in such a manner that the disadvantages of the known construction are avoided, more specifically the connector elements are to be held in place in the strip without impairing the bendability of the joint between the two conveyor ends;
- to permit the visual inspection of the connection, especially at the time when the two belt ends are secured to each other; and
- to provide stop means which determine the extent to which the belt end is to enter into the connector.

SUMMARY OF THE INVENTION

According to the invention there is provided a connector strip for conveyor belts, comprising preformed individual elements which are held together by a wire secured to the inside of the elements, wherein the wire has a wavy shape.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE PRESENT INVENTION

Figure 1:
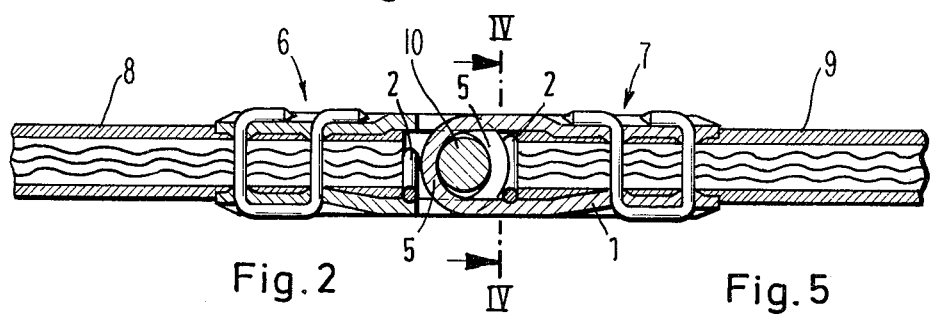
FIG. 1 shows a vertical section through a conveyor belt connection.

According to the drawing a wavy wire 2 is arranged on the inside of elements 1 of each connector strip. As shown in FIG. 1, the two connector strips 6 and 7 secured to the elt ends 8 and 9 respectively, are held together by a conventional hinge pin 10.

According to FIGS. 1 to 4 the waviness of the wire 2 is located about perpendicularly to the leg of the connecting strip to which a crest side of the wire 2 is secured.

Further, it is practical, if the distance of the wire 2 to the facing edge 3 of the connecting element 1 corresponds to the desired penetration depth of the belt end 4 into the mouth of the strip.

Figures 2, 5:
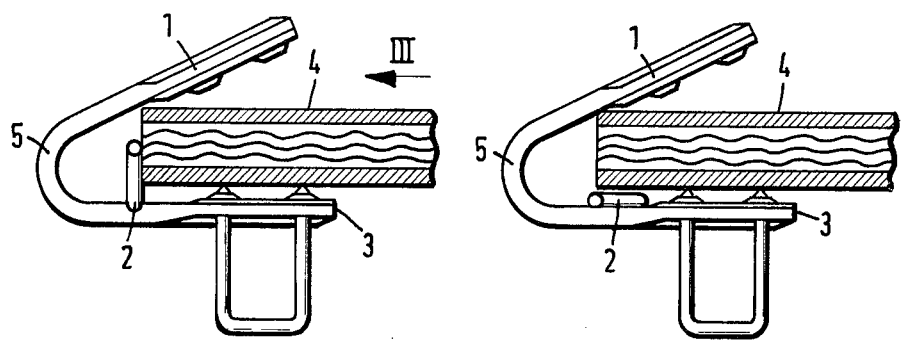
FIG. 2 shows a vertical section through a connector strip into which the belt end has been inserted for the pressure connecting operation.
FIG. 5 shows an illustration similar to FIG. 2 for another embodiment.
Figure 3:
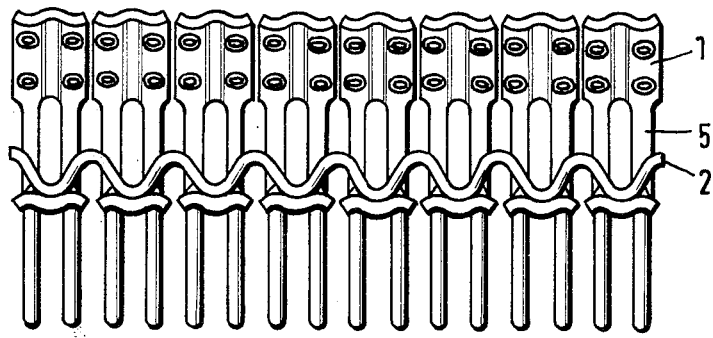
FIG. 3 is a view from the right in the direction of the arrow III in FIG. 2.
Figure 4:
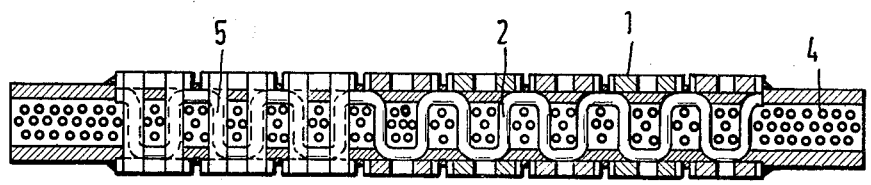
FIG. 4 is a sectional view in the direction of the arrows indicating the section line IV—IV in FIG. 1 for wire having a U-shape waviness.

In the embodiment of FIGS. 1 to 3 the wire 2 is curved in a wavy manner. The waviness may have a U-shape. In that instance it is possible that the bights 5 of the connector elements are permitted to reach into the U-shaped wave forms of the wire 2 whereby the structural depth of the connection may be kept shorter, (FIG. 1, right-hand portion, FIG. 4). This was not possible in connection with the prior art sheet metal stops bent out of each connector elements, said stops being provided for the facing edge of the belt end.

In the embodiment according to FIG. 5 the waviness of the wire 2 extends in parallel to the leg of the connecting element to which the wire is secured. This feature increases the elasticity in the cross direction of the connector strip. However, the stop is not provided in this embodiment.

The above described disadvantages of prior art constructions having a straight holding wire or paper strip have been avoided by the formation of the cross wire 2 according to the invention. The connection remains bendable. The sensitivity of the paper strip has been obviated and the visual inspection of the connection as it is being produced is assured.

Although the invention has been described with reference to specific example embodiments, it is to be appreciated that it is intended to cover all modifications and equivalents within the scope of the appended claims.

What is claimed is:

1. A connector strip for securing the ends of a conveyor belt to each other by means of a hinge pin, comprising a plurality of individual connector elements and means (2) operatively holding together said individual connector elements to form said strip, said holding means being rigidly secured to a surface of each connector element forming the strip, said holding means comprising a wire member having a wave form which is so connected to each connector element that the elements of a strip are axially aligned for the insertion of the hinge pin, whereby the bendability of the connector strip is assured for facilitating the insertion of the hinge pin (10).

2. The connector strip of claim 1, wherein each of said connector elements has two legs and a bight, said wire member having crests in its wave form secured to an inside surface of a leg of each connector element, said wave form of said wire member extending about perpendicularly to the leg of the respective connector element.

3. The connector strip of claim 1 or 2, wherein said wire member is secured to each connector element in such position spaced away from a free end of the respective connector element that the wire member acts as a stop for an inserted end of said conveyor belt whereby the wire member determines the desired penetration depth of the conveyor belt end into the connector element.

4. The connector strip of claim 1, wherein said wave form of said wire member comprises a plurality of U-shapes.

5. The connector strip of claim 1, wherein each of said connector elements has two legs and a bight, said wave form of said wire member having a plurality of U-shapes, said wire member being secured to an inside surface of a leg of each connector element in such position that the bights of the connector elements secured to one conveyor belt end penetrate into the U-shapes of the wire member secured to the connector elements of the other connector strip secured to the other conveyor belt end.

6. The connector strip of claim 1, wherein each of said connector elements has two legs and a bight, said wire member being secured to a leg of each connector element in such a position that the wave form of the wire member extends substantially in parallel to the respective connector element leg to which the wire member is secured.

* * * * *